Nov. 2, 1965    W. A. SCHOEFFLER    3,215,220
SAFETY SEAT BELT RELEASE AND IGNITION CUTOFF SYSTEM
Filed May 22, 1963                              2 Sheets-Sheet 1
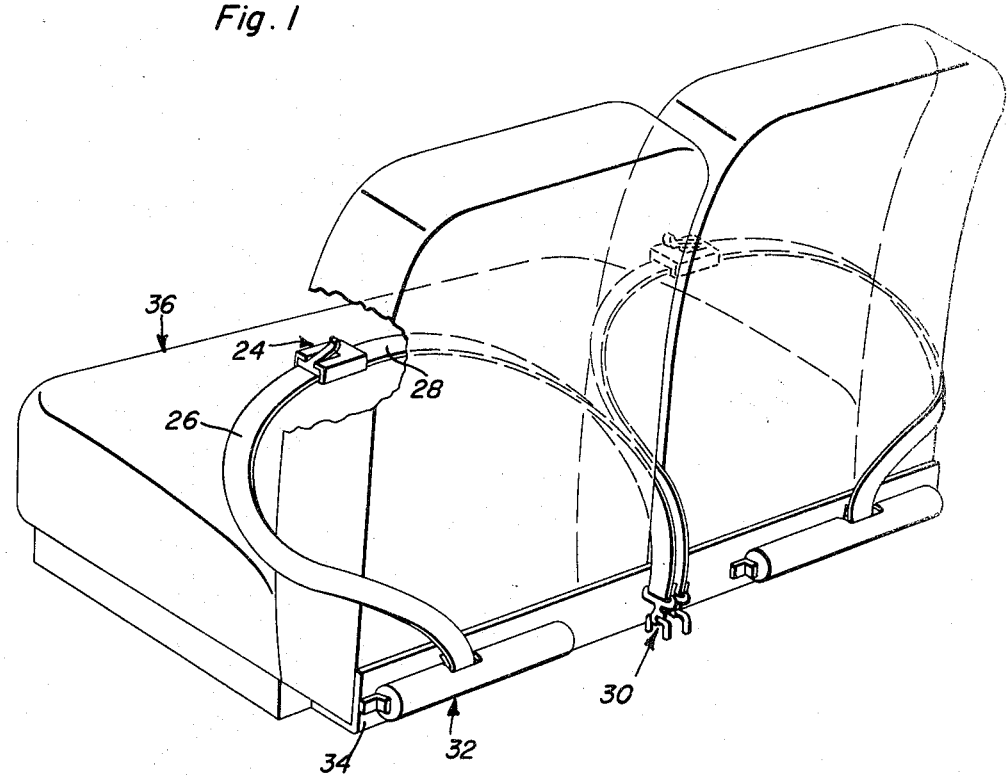
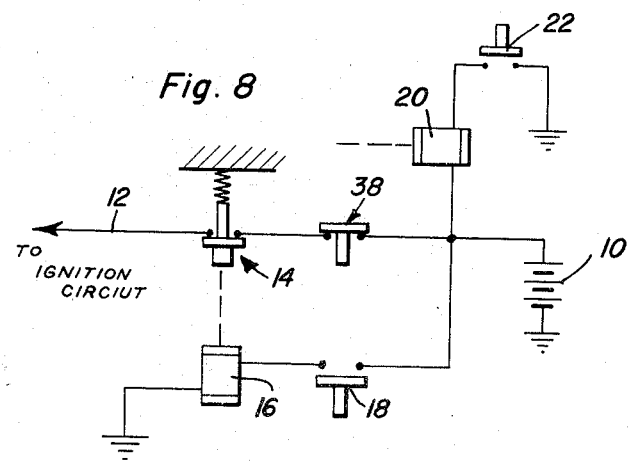
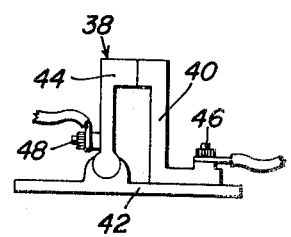
William A. Schoeffler
INVENTOR.

Nov. 2, 1965   W. A. SCHOEFFLER   3,215,220
SAFETY SEAT BELT RELEASE AND IGNITION CUTOFF SYSTEM
Filed May 22, 1963   2 Sheets-Sheet 2
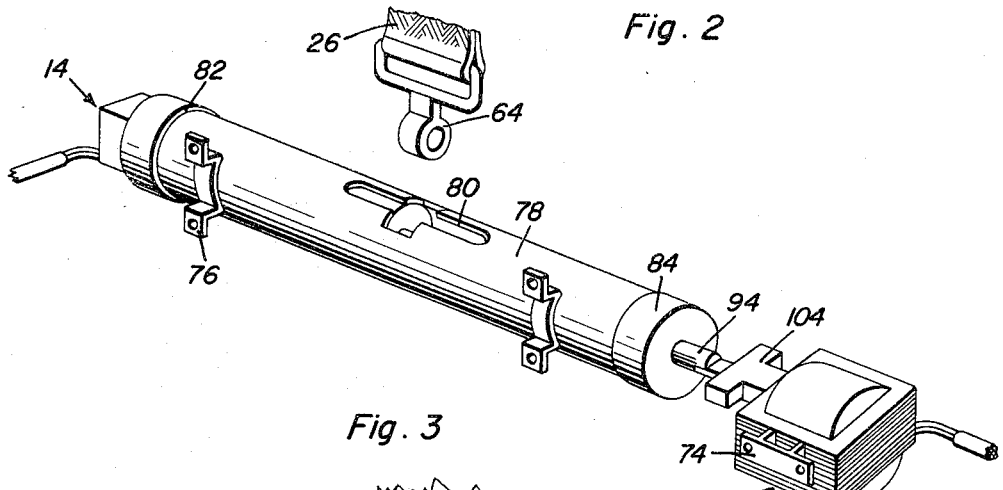
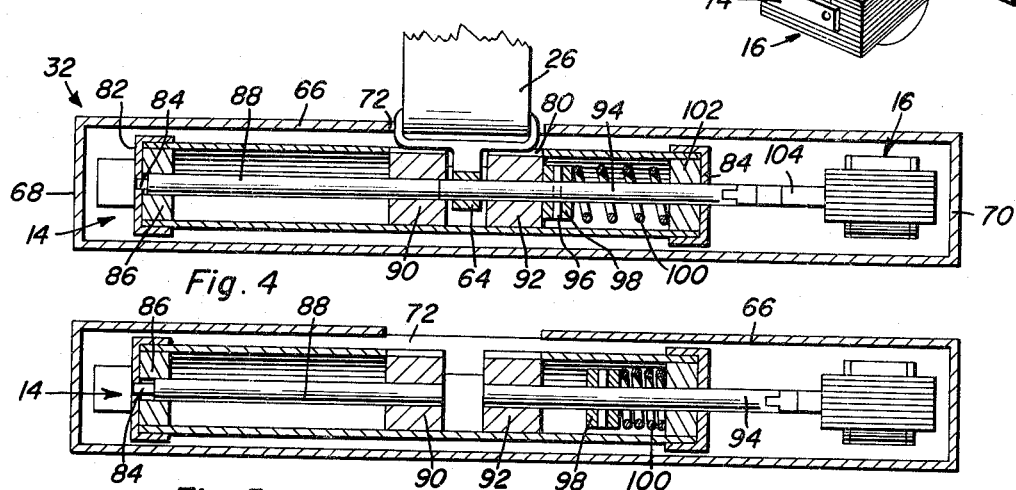
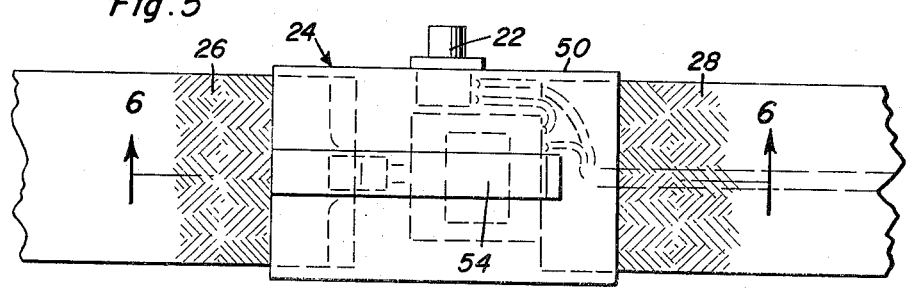
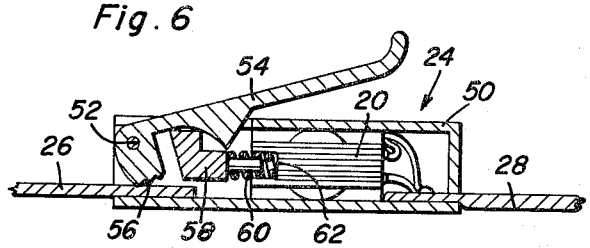
William A. Schoeffler
INVENTOR.

United States Patent Office 3,215,220
Patented Nov. 2, 1965

3,215,220
SAFETY SEAT BELT RELEASE AND
IGNITION CUTOFF SYSTEM
William A. Schoeffler, 4011 California Ave.,
Carmichael, Calif.
Filed May 22, 1963, Ser. No. 282,313
4 Claims. (Cl. 180—82)

This invention relates generally to vehicle safety systems and more particularly to a releasable safety seat belt control system.

One of the important functions of a vehicle safety system, is the provision of means for interrupting the ignition circuit associated with the vehicle engine so as to avoid the danger of fire following a collision or other emergency situation. Accordingly, the vehicle source of electrical energy is disconnected from the ignition circuit by the system of the present invention but only in conjunction with the successful release of the safety seat belt from its anchoring connection to the vehicle. In this way, effective use may be made of seat belts without in any way impeding departure or removal of the driver or a passenger from a vehicle under emergency conditions such as following a collision. The vehicle safety system may also be utilized in connection with other safety features and without in any way impairing normal use of the seat belts.

It is therefore a primary object of the present invention to provide a selectively operable releasing mechanism through which a safety seat belt is anchored to a vehicle structure and by means of which the vehicle ignition circuit may be disconnected from its power source under emergency conditions and only after the successful release of the seat belt anchor.

Another object of the present invention is to provide a safety seat belt control arrangement by means of which the buckle device of the seat belt may be released by selectively energized means under normal conditions without interfering with operation of the emergency releasing mechanism aforementioned. Also in connection with the safety system, an impact or collision-responsive circuit breaker is provided whereby interruption of the ignition circuit may be achieved independently of the selective control through which the anchor for the seat belt is also released.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a typical installation of the safety seat belt arrangement forming part of the vehicle safety system of the present invention.

FIGURE 2 is a perspective view of disassembled portions of the selectively controlled anchor release mechanism for the safety seat belt.

FIGURE 3 is a longitudinal sectional view through a selectively controlled anchor release unit in a belt-anchoring condition.

FIGURE 4 is a longitudinal sectional view of the anchor release unit in a released condition.

FIGURE 5 is a top plan view of the buckle portion of the safety seat belt.

FIGURE 6 is a partial sectional view taken substantially through a plane indicated by section line 6—6 in FIGURE 5.

FIGURE 7 is a partial side elevational view of an impact-responsive switch device utilized in the vehicle safety system of the present invention.

FIGURE 8 is an electrical circuit diagram associated with the vehicle safety system of the present invention.

Referring initially to FIGURE 8, it will be observed that the vehicle safety system of the present invention is associated with a source of electrical energy such as the battery 10 of a vehicle operatively connected to the primary portion of an ignition circuit by the conductor 12. The output terminal of the battery 10 is therefore connected to the conductor 12 and to the ignition circuit through a normally closed ignition cut-out switch 14 which is adapted to be opened upon energization of a solenoid device 16. An energizing circuit for the solenoid device 16 from the battery source 10, may therefore be completed upon actuation of the manually actuated switch 18. The selectively actuated switch 18 may therefore be mounted at any suitable location in the vehicle such as the dashboard whereby the vehicle operator may actuate the switch under emergency conditions. Also connected to the source of energy 10, is a solenoid device 20 adapted to be energized upon closure of the manually actuated switch 22. The solenoid device 20 is therefore associated with the buckle device 24 in each safety seat belt as illustrated for example in FIGURE 1. Each seat belt therefore includes a pair of flexible straps 26 and 28. One of the straps may therefore be permanently anchored to the vehicle by any suitable anchoring assembly 30 while the other strap 26 for example, may be releasably anchored to the vehicle by means of a selectively controlled anchor release unit 32 secured to the seat frame portion 34 associated with the vehicle seat 36. Finally, the vehicle safety system includes a normally closed impact-responsive switch 38 adapted to be opened in response to a collision for example in order to interrupt the ignition circuit independently of the ignition cut-out switch 14 which is under control of the solenoid device 16. The impact-responsive switch may therefore be mounted in the vehicle at any suitable location and as illustrated in FIGURE 7, will include a fixed contact member 40 secured to the vehicle frame member 42 and a magnetic contact member 44 pivotally mounted on the vehicle frame member 42 and held in contact with the fixed contact member 40 by magnetic attraction. Accordingly, terminal posts 46 and 48 are associated with the fixed and magnetic contact members respectively in order to establish an electrical connection between the battery source 10 and the ignition circuit through the conductor 12.

Under normal conditions, the buckle device 24 will be utilized in order to strap one's self to the vehicle seat 36. The buckle device as more clearly seen in FIGURES 5 and 6 will therefore include a casing 50 secured to the belt strap 28. Mounted at one end of the casing by means of a pivot pin 52, is a pivoted lock member 54 having a toothed portion 56 engageable with the end of the strap 26 for locking thereof within the casing 50. The lock member 54 is held in a locking position by a plunger element 58 under the bias of a return spring 60 seated within a recess 62 of the solenoid device 20. Accordingly, upon energization of the solenoid device 20, the plunger element 58 will be withdrawn against the bias of the spring 60 in order to release the lock member from engagement with the belt strap 26. Toward this end, the manually operated switch 22 is mounted on the side of the casing 50 of the buckle device and electrically wired to the solenoid device 20 for energization thereof by the battery source of power 10 as aforementioned. The vehicle driver or passenger may therefore normally release the buckle device by merely depressing the switch 22 on the side of the casing 50. Release of the anchor element associated with the belt strap 26, is effected under emergency conditions by actuation of the switch 18.

Referring therefore to FIGURES 2, 3 and 4, it will be observed that the belt strap 26 is provided at one end thereof with an anchor element 64 releasably anchored by the unit 32. The unit 32 therefore includes an elongated housing 66 secured at opposite ends 68 and 70 to the seat frame 34. A slot 72 is formed intermediate the ends of the housing 66 through which the anchor element 64 is inserted or released. Mounted in fixed relation within the housing 66 adjacent the end 68, is the ignition cut-out switch 14 while the solenoid device 16 is mounted adjacent the end 70 by means of the solenoid mounting member 74. Fixedly mounted by the bracket elements 76 between the ignition cut-out switch 14 and solenoid device 16, is a tubular shaft casing 78 having a slot 80 formed intermediate the ends thereof in alignment with the slot 72 in the outer housing 66. The tubular casing 70 is therefore closed at opposite axial ends thereof by means of apertured end caps 82 and 84. The end cap 82 is disposed in abutting relation to the cut-out switch 14 so that the switch actuator portion 84 thereof projects through the aperture of the end cap into the bore of an end bearing member 86 which slidably receives one end of an actuating rod 88 disposed within the tubular casing 78. The actuating rod 88 is therefore normally held in engagement with the switch actuating portion 84 as illustrated in FIGURE 3 in order to hold the switch 14 in a closed condition. The opposite end of the actuating rod 88 is slidably mounted within a slide bearing member 90 disposed intermediate the ends of the tubular casing member 78 in spaced relation to a second slide bearing member 92. Thus, the seat belt anchor element 64 inserted through the slots 72 and 80 will be received between the slide bearing members 90 and 92 for anchoring thereof by means of a plunger member 94.

The plunger member 94 as illustrated in FIGURE 3 is slidably received within both slide bearing members 90 and 92 in abutting relation to the actuating rod 88. Secured to the plunger 94 by means of the pin 96, is spring retainer and stop element 98 limiting movement of the plunger 94 into the slide bearing member 90 under the urge of the compression spring 100. The compression spring therefore reacts between the element 98 and the end bearing member 102 enclosed by the end cap 84 through which the plunger member 94 projects for pin connection to the armature 104 of the solenoid device 16. It will therefore be apparent, that when the solenoid device 16 is energized, the plunger 94 will be completely withdrawn from the slide bearing 90 to the position illustrated in FIGURE 4 against the bias of the spring 100 to thereby release the anchor element 64. Also, when releasing the anchor element, the plunger 94 will move out of engagement with the actuating plunger 88 so that the spring within the switch 14 may displace the rod 88 to the position illustrated in FIGURE 4 opening the switch 14 in order to interrupt the ignition circuit. It will therefore be apparent, that when the safety belt anchor is either being released or inserted into the unit 32, by energization of the solenoid device 16 under control of the switch 18, the ignition circuit of the vehicle will be interrupted.

From the foregoing description, the construction, operation and use of the vehicle safety system of the present invention will be apparent. It will therefore be appreciated, that the safety seat belts of the present invention may be easily released either under normal or emergency conditions and only under emergency conditions will the ignition circuit be cut-out in order to avoid the danger of fire. Also, interruption of the ignition circuit in response to a collision may be effected independently of the selectively controlled belt releasing devices as an additional safety measure.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a source of energy for the ignition circuit of a vehicle having a cut-out switch, a safety seat belt assembly comprising, flexible strap means having a releasable buckle device and a releasable anchor element rigidly anchored to the vehicle, selectively energized means operatively connected to said source of energy for releasing said buckle device and the anchor element respectively, means responsive to release of said anchor element only for opening said cut-out switch to disable the ignition circuit and impact-responsive switch means connected to the ignition circuit in series with the cut-out switch for disconnection thereof from the source of energy, said selectively energized means being connected to the source of energy in parallel with the impact responsive switch means.

2. In combination with a safety seat belt for a vehicle having an ignition circuit and an ignition cut-out switch adapted to interrupt the ignition circuit, a releasable anchoring assembly for the anchor element of the seat belt comprising; an elongated housing adapted to be secured to the vehicle and having a slot through which said anchor element is received, spaced slide bearings mounted in said housing for receiving said anchor element therebetween, means fixedly mounting said ignition cut-out switch in spaced relation to the slide bearings within said housing, spring biased plunger means slidably mounted by said slide bearings for anchoring the anchor element therebetween, selectively energized means operatively connected to said plunger means for withdrawal thereof from one of the slide bearings to release the anchor element, and switch actuating means slidably mounted by said one slide bearing for opening the cut-out switch in response to said withdrawal of the plunger means to interrupt the ignition circuit only after successful release of the anchor element.

3. The combination of claim 2, wherein said actuating means comprises, a rod member axially aligned with said plunger means in abutting relation thereto within said one slide bearing for holding the cut-out switch in a closed condition completing the ignition circuit.

4. In combination with a safety seat belt having an anchor element and a cut-out switch, a releasable anchoring assembly comprising mounting means adapted to be secured to a vehicle, spaced members mounted by said mounting means for receiving the anchoring element therebetween, means mounting said cut-out switch in spaced relation to one of said members on the mounting means, retractible means movably mounted by said members for rigidly anchoring the anchor element therebetween, selectively energized means operatively connected to said retractible means for withdrawal thereof from one of said members to release the anchor element, and means mounted by said one of the members for actuating the cut-out switch in response to said withdrawal of the retractible means.

References Cited by the Examiner

UNITED STATES PATENTS

| 2,660,715 | 11/53 | Glass et al. | |
| 2,777,531 | 1/57 | Erickson | 180—82 |
| 2,868,309 | 1/59 | Burgess | 180—82 |
| 2,880,789 | 4/59 | Leibinger | 180—82 |
| 3,047,689 | 7/62 | Vardara | 200—61.45 |

A. HARRY LEVY, *Primary Examiner.*